United States Patent

Arnauts et al.

[11] Patent Number: 6,051,312
[45] Date of Patent: Apr. 18, 2000

[54] FIBERS OF STRONGLY BRANCHED POLYAMIDE

[75] Inventors: Jan E. F. Arnauts, Beringen, Belgium; Atze J. Nijenhuis, Sittard, Netherlands; Ellen M. M. de Brabander-ven den Berg, Schinnen, Netherlands; Cornelis Versluis, Stein, Netherlands; Martien Serné, Sittard, Netherlands

[73] Assignee: DSM NV, Heerlen, Netherlands

[21] Appl. No.: 09/205,174

[22] Filed: Dec. 4, 1998

Related U.S. Application Data

[63] Continuation of application No. PCT/NL97/00324, Jun. 6, 1997, abandoned.

[30] Foreign Application Priority Data

Jun. 6, 1996 [NL]  Netherlands ........................... 9600512

[51] Int. Cl.[7] .................................................. D02G 3/00
[52] U.S. Cl. .......................................... 428/364; 428/395
[58] Field of Search .................................... 428/364, 395; 528/310, 312, 314, 315, 327, 322, 325, 332, 341

[56] References Cited

U.S. PATENT DOCUMENTS

| | | |
|---|---|---|
| 2,863,857 | 12/1958 | Costain et al. . |
| 3,296,214 | 1/1967 | Pickett, Jr. . |
| 3,304,289 | 2/1967 | Ballentine et al. . |
| 3,549,601 | 12/1970 | Fowell . |
| 3,651,023 | 3/1972 | Ottenheym et al. . |
| 3,687,904 | 8/1972 | Middleton . |
| 3,705,877 | 12/1972 | Ishikawa et al. ..................... 260/75 N |
| 3,884,702 | 5/1975 | Koshimo et al. ..................... 96/115 P |
| 4,075,271 | 2/1978 | Lofquist et al. . |
| 4,690,985 | 9/1987 | Tomalia et al. ........................ 528/403 |
| 4,721,650 | 1/1988 | Nunning et al. . |
| 5,530,092 | 6/1996 | Meijer et al. ........................... 528/363 |
| 5,610,268 | 3/1997 | Meijer et al. ........................... 528/363 |
| 5,700,934 | 12/1997 | Wolters et al. ......................... 540/538 |
| 5,780,623 | 7/1998 | Guit et al. .............................. 540/538 |
| 5,859,148 | 1/1999 | Borggreve et al. ..................... 528/323 |
| 5,877,314 | 3/1999 | Herk et al. ............................. 540/538 |

FOREIGN PATENT DOCUMENTS

| | | |
|---|---|---|
| 0191746 A2 | 8/1986 | European Pat. Off. . |
| 0345648 A2 | 12/1989 | European Pat. Off. . |
| 0672703 A1 | 9/1995 | European Pat. Off. . |
| 0682057 A1 | 11/1995 | European Pat. Off. . |
| 4100909 A1 | 7/1992 | Germany . |
| 749479 | 5/1956 | United Kingdom . |

*Primary Examiner*—Newton Edwards
*Attorney, Agent, or Firm*—Pillsbury Madison & Sutro LLP

[57] ABSTRACT

The invention relates to a polyamide fiber whose polyamide is heavily branched. The branched polyamide preferably has 3–20 branches which are joined to a core molecule which is smaller than the polyamide arms. The arms originate preferably from functional groups which are identical and are preferably carboxyl groups. The polyamide is chosen from the group of polyamides which are produced by polycondensation of $\alpha,\omega$-aminocarboxylic acids or by ring-opening polymerization of lactams. Preferably, the polyamide is nylon-6. The properties of the fiber according to the invention are at least at the same level as those of fibers obtained by spinning linear polyamide. The spinning process for the fiber according to the invention is less susceptible to faults. Inter alia, the viscosity of the polyamide no longer changes during the spinning process.

24 Claims, 3 Drawing Sheets

FIBERS OF STRONGLY BRANCHED POLYAMIDE

RELATED APPLICATIONS

This is a continuation application of international Application No.: PCT/NL97/00324 filed Jun. 6, 1997, which designated the U.S., now abandoned.

FIELD OF THE INVENTION

The invention relates to polyamide fibers.

BACKGROUND OF THE INVENTION

As a result of an increasingly further-reaching quality control of the raw materials for the polyamide fibers and of a very well-developed technology for spinning, polyamides, in particular nylon-6, are now being successfully spun for textile yarns at spinning speeds of 6000 metres per minute and sometimes even higher.

At such extreme speeds, the spinning process is very susceptible to variations, especially to variations in the melt viscosity of the polyamide presented and even small variations result in fiber rupture. In the case of failure of one spinnerette, an appreciable difference in molecular weight and, therefore in the properties of the fiber from the remaining spinnerets of a production line will occur.

However, the limit of what is possible appears to have been reached with the present generation of polyamides, in particular nylon-6, and a breakthrough is necessary to achieve a further increase in the spinning speed or a further reduction in faults.

The inventors have achieved such a breakthrough by spinning the fibers of branched polyamides completely contrary to the prevailing teaching on polymers for fiber spinning. Said prevailing teaching is evident, inter alia, from the following literature citations.

In their authoritative series of publications entitled "Studies of polymerisation and ring formation" in Part XV, Artificial fibers from linear condensation superpolymers, J. Am. Chem. Soc., 54, 1579–87 (1932), Carothers and Hill make an attempt to provide a basis and, in doing so, refer to the importance of the molecular length for the strength. Furthermore, it is stated that crystallization is important and that "Linear condensation polymers are quite generally crystalline unless bulky substituents are present to destroy the linear symmetry of the chains".

Later publications and textbooks also emphasize the importance of linear molecules and consider the presence of side chains as troublesome, if not impossible. Examples of this are found in R. W. Moncrieff, Artificial Fibers, National Trade Press, London (1950), pages 30 and 48 and, in particular, on page 194 "It should be noted that the molecules of nylon are long and straight, that there are no side-chains or cross linkages." J. G. Cook in Handbook of Textile Fibers, II Man-made Fibers, 5th ed. Mirrow, Shildon, UK (1984), pages IX and X states "The molecules of a fiber are thus in shape very similar to the fiber itself. And just as the fiber bestows its characteristics on the yarn of which it forms a single strand, so does the fiber derive its properties from the thread-like molecules of the substance it is made. . . . But it is only the very special types of long molecule that are able to form fibers. They must, for example, be fairly regular in shape with a repeating pattern of atoms in the molecule. They must not have large pendant groups of atoms sticking out from the sides."

In summary, it follows from the above that the existing teaching is that, in the synthesis of polyamides for use as fiber material, the occurrence of branching must be avoided.

The inventors have, however, found very surprisingly that a fiber having comparable mechanical properties to those of a fiber composed of linear polyamide is obtained with heavily branched polyamide in a very reproducible way with a lower sensitivity to faults, as for instance fiber rupture during spinning.

A further advantage of the fiber made of branched polyamide according to the invention is that it can be obtained with a lower melt temperature at the same spinning speed or a higher spinning speed at the same temperature as the fiber composed of linear polyamide having the same relative viscosity.

DETAILED DESCRIPTION OF THE INVENTION

Figure 1B:
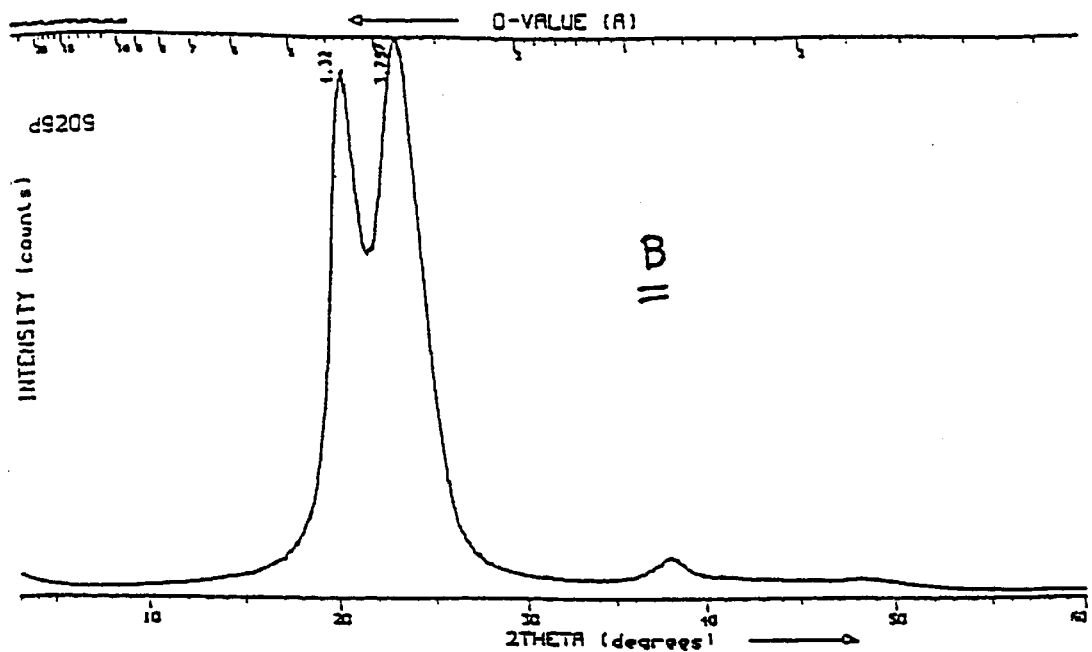
FIG. 1B is an X-ray diffraction (WAXS) curve for the fiber of polyamide C-1.

The polyamide fiber according to the invention is characterized in that the polyamide from which the fiber is obtained is a branched polyamide.

In principle, all common monomer units are suitable as building block for the branched polyamides.

In this context, branched polyamide is understood as meaning a polyamide which is composed of at least 3 linear chain arms and of which the chain arms are formed on a core molecule whose size is less than the average length of the polyamide arms joined thereto. This kind of branched polyamides generally are named star-branched.

The core molecule being derived from a molecule having at least 3 functional groups at which the linear polyamide arms are fixed. Preferably the functional groups are chosen from the group of amine or carboxylic acid groups.

Preferably, the molecular weight of the core molecule is less than 2000, more preferably less than 1000, and most preferable is a core molecule having a molecular weight of less than 500.

EP-A-672 703 describes a method of preparing star branched polyamides by mixing a linear polyamide for a short time with an at least 3-functional compound in the melt. The polyamide obtained by this method is, however, unsuitable as raw material for the purpose of the invention because its molecular weight distribution is very wide, the polyamide comprises, in contrast to what is stated in the description, a mole fraction of linear polyamide which is, in very many cases, greater than the mole fraction of star branched polyamides and, moreover, the melt viscosity is unstable.

In general are preferred polyamides of the AB type which can be obtained, inter alia, by polycondensation of amino acids, preferably $\alpha,\omega$-amino acids, or by ring-opening polymerization of lactams, copolyamides thereof and, if desired, polyamides which contain substituted monomers to a limited extent. Examples of such polyamides are nylon-4, nylon-6, nylon-8, nylon-11 and nylon-12. Of these, nylon-6 is preferred in view of the versatility of the possible applications.

At present star-branched polyamide of the AABB type, for instance obtainable from diamines and dicarboxylic acids are difficult to obtain without appreciable crosslinking. However, if once obtainable without appreciable crosslinking, fibers will show the same advantage as those of the presently preferred AB polyamides.

To prepare the branched polyamides of the AB type, for large-scale applications preference is given to the method in which the branched polyamide is obtained by copolymerization of the core molecule with the monomer for the chain units of the polyamide under the standard reaction conditions for the synthesis of the linear polyamide and preferably in the absence of a chain length regulator.

If yet another polymerization initiator is present in addition to the multifunctional core molecule, for example in the case of the synthesis of branched nylon-6, aminocaproic acid and/or water, a linear polyamide will also be produced. If the polymerization initiator and the functional groups of the core molecule are the same, the chain length of the linear polyamide formed will generally correspond, given sufficient reaction time, to the length of the polyamide arms in the branched polyamide.

Such a mixture also appears eminently spinnable to form a fiber, a substantial improvement in the spinning conditions and a lower sensitivity to faults being obtained with respect to the linear polyamide.

Nevertheless, the greatest preference in such a case is to convert, by means of a postcondensation, preferably in the solid phase under inert gas conditions, the linear polyamide present into the branched polyamide, a polyamide having an exceptionally good melt stability and a very reproducible spinnability thereby being obtained. If desired, this solid-phase postcondensation is followed by an equilibration in the melt.

For a fiber having good properties, the number of arms should not be too high. Generally, a polyamide which crystallizes well is not obtained with a degree of branching higher than 20. Such a high degree of branching presents problems during spinning and stretching. Preferably, the number of arns is not more than 10, still more preferably not more than 8. The best results are obtained with 3–6 arms on the core molecule.

The length of the arms may vary within wide limits and is, inter alia, dependent on the extent to which the polyamide is branched. Preferably, the length of the arms at least corresponds to a number-average molecular weight of approximately 4000, more preferably at least 5000.

Branched polyamides which are obtained with a core molecule having one type of functional groups yield the best results. For example, compounds which contain only amine groups, for example 4-aminomethyl-1,8-octanediamine, as core molecule with nylon-6, yield a branched polyamide which is excellently spinnable. Particular advantage is offered by the use of a core molecule containing identical functional groups which are reactive only with the amine groups of the polyamide. In this case, a branched polyamide is produced which has a very low amino end groups content, its fibers having a very high thermal and hydrolytic stability. Examples of such functional groups which are reactive only for the amine groups are carboxylic acid groups or carboxylic acid ester groups.

Examples of core molecules containing 3 or more carboxylic acid groups are trimesic acid or β,β'-bis(adipic acid), 1,2,4,5-benzenetetracarboxylic acid and biphenyltetracarboxylic acid. Preferably, the reactive functional groups are accessible to the same extent for the growth of polyamide arms.

Fibers of polyamides having a very low amino end group content, however, are very difficult to dye with anionic dyestuffs, which can mean a serious drawback in practice, for example, for textile applications.

Very surprisingly, it has now been found that, if the core molecule containing at least 3 carboxylic groups is an alkaline, nonreactive group, for example a secondary or tertiary (cyclo)alkylamine or a heterocyclic compound containing at least one nitrogen atom in the ring, this drawback does not exist and the affinity for dyestuffs of the fiber with anionic dyestuffs is very good and is also very reproducible and has, for example, low sensitivity to faults in the spinning process. The colour-fastness is also very good, generally even better than for the linear polyamides terminated by amino end groups.

Examples of such nitrogen-containing compounds are derived from pyrimidine, triazine, quinoxaline, piperidine, pyridine, piperazine, carbazole, benzimidazole and quinoline. Very suitable are trifunctional or more highly functional carboxylic acids derived from triazine. Such acids are simple to prepare starting from cyanuric chloride by substituting the three chlorine atoms with carboxylic acid. Preferably, the carboxylic acid to be substituted contains at least 2 carbon atoms. Very suitable is the substitution of the three chlorine atoms of cyanuric chloride with aminocaproic acid. In principle, it is possible to prepare the branched polyamide for the fiber according to the invention by starting directly from cyanuric chloride or other chlorine-substituted compounds. The hydrogen chloride liberated in this process has, however, serious practical drawbacks which also apply, albeit sometimes to a lesser extent, if, instead of carboxylic acids, inorganic acid groups of the organic core molecule are started from.

Preferably, the carboxyl groups are joined via an acyclic chain to the core molecule. This offers the advantage that the risk of steric hindrance is appreciably reduced and a wide molecular weight distribution of the polyamide arms in the branched polyamide is avoided as a consequence thereof.

For the same reasons, the core molecules on which the various carboxylic groups are present preferably have a symmetrical structure, as a result of which an equal reactivity of the carboxyl groups is promoted.

Furthermore, it is desirable that the core molecule for the branched polyamide is sufficiently stable under the conditions of polymerization and the spinning conditions. For this reason, diverse core molecules which are known from the literature on branched polyamides are unsuitable in practice.

The spinning process is most reproducible if the molecular weight distribution of the polyamide is as narrow as possible. For branched molecules, in which no significant crosslinking is present it is in principle narrower than for linear polyamides. It is therefore another component of the invention that the fiber is obtained from a polyamide having a molecular weight distribution Mz/Mw of <1.5, Mz/Mw preferably being ≦1.4. Preference is given to the ratio Mz/Mw as parameter for the molecular weight distribution instead of Mw/Mn because Mz can be determined more definitely than Mn, it being possible to determine Mz and Mw by means of gel permeation chromatography (GPC) with the universal calibration method. However, it is difficult with the aid of the above procedure to arrive at absolute values for Mz and Mw and a completely equilibrated linear polyamide should also be determined as a reference, in the same gel permeation chromatography run. The principles of the molecular weight determination by GPC, as well as the definitions of Mn, Mw and Mz are described in more detail in W. W. Yau et al., Modern size-exclusion liquid chromatography, J. Wiley & Sons, (1979). The narrow molecular weight distribution requirement can only be fulfilled if crosslinking is not significantly present. In practice however some crosslinking will altimes be present due to impurities, however deliberate crosslinking is avoided.

On the basis of general mathematical statistics, in the case of polymers having a so-called Flory distribution it is found that $M_z/M_w=1.5$ for the linear polyamide, 1.25 for a polyamide having 3 arms, 1.20 for 4 arms and 1.16 for 6 arms.

By comparing the chromatograms, these differences in Mz/Mw can be detected immediately in the differences in the peak width.

The invention is now explained in greater detail by reference to the following examples and comparative experiments without being limited thereto. Although the examples are limited to nylon-6, it will be clear to the person skilled in the art that another nylon, for example nylon-4, -8, -10, -12 etc., could be used instead, as could a copolyamide thereof.

Preparation of Branched Polyamide:

A.1. A commercial nylon-6, Akulon F135C supplied by DSM, the Netherlands, having a relative viscosity, $\eta_{rel}$, measured in sulphuric acid, of 3.40, Mn=27,000 and Mw=53,000 was blended in an extruder at 270° C. and with a residence time of 3 minutes with N,N,N'N'-tetrakis-(aminopropyl)-1,4-diaminobutane (0.5% by weight relative to the polyamide). A product was obtained having $\eta_{rel}=2.52$ and a content of water-extractable material of 1.5% by weight. The melt viscosity, $\eta_o$, measured by DMA (dynamic mechanical analysis) going from high to low frequency using a Rheometrics 800 apparatus is 580 Pa·s at 240° C. The product obtained has a wide molecular weight distribution Mz/Mw=1.6, Mw/Mn=2.0 corresponding to that of a linear polyamide-6 having the same $\eta_{rel}$.

B.1. A branched polyamide of nylon-6 was prepared by reacting ε-caprolactam in the presence of triscaproic acid melamine, 1,3,5-triazine-2,4,6-tris(aminocaproic acid), under the standard conditions of the hydrolytic preparation of linear nylon-6. After washing with water to remove residual caprolactam and low-molecular-weight residues, the polyamide obtained was postcondensed for 10 hours at 190° C. under a vacuum with a nitrogen leak.

The 1,3,5-triazine-2,4,6-tris(amino caproic acid) was prepared by reacting cyanuric chloride with ε-amino caproic acid in aqueous medium in the presence of sodium hydroxide to neutralize the liberated hydrochloric acid, at a temperature of 0–5° C.

A typical polymerization proceeded as follows. In a 5 l reactor, 3.50 kg of caprolactam, 35.0 g of ε-aminocaproic acid, 70.0 g of water and 58.7 g of triscaproic acid melamine were added together and subjected to the following temperature program: 1) 1 minute at 90° C., 2) from 90 to 275° C. in 132 min, 3) 8 hours at 275° C., 4) from 275 to 240° C. in 1 hour and finally, more than 8 hours at 240° C. During 1) and 2) and the first 2 hours of 3), the system was closed, then the pressure was let down to atmospheric pressure and the polymerization was carried out further with nitrogen being passed over the mixture. The reactor contents were tapped off by applying an overpressure at a temperature of 230° C. The polymer strand forced out of the reactor was passed through an ice-water bath and wound onto a reel and then cut into granules, which were washed with water at 100° C. for 2 hours, the wash water being refreshed 7 times.

The yield of 7 batches was combined, dried and postcondensed. Analysis of the polyamide prior to postcondensation yielded the following results: The average oligomer content determined by HPLC was 7.13% by weight. The content of water-soluble extract (WOE) was 9.0% by weight. The intrinsic viscosity measured in 85% by weight of formic acid was 0.76 dl/g.

The intrinsic viscosity after postcondensation was 0.95 dl/g. The dynamic melt viscosity, $\eta_o$, increases as a result of postcondensation from 146 to 613 Pa·s. The polydispersity Mw/Mn is approximately 1.58, Mz/Mw=1.36.

B.2. Instead of 1,3,5-triazine-2,4,6-tris(amino caproc acid) 1,3,5-triazine-2,2,4,4,6,6-hexa(amino caproic acid) was prepared by reacting cyanuric chloride with amino-biscaproic acid. A branched polyamide of nylon-6 was prepared as in B.1. 2.42 g of the hexa acid was reacted with 100 g ε-caprolactam to obtain a six-armed branched polyamide-6 with about 50 caproamide units per arm.

Properties of the branched polyamide before and after postcondensation were Mz/Mw=1.25 resp. Mz/Mw=1.2, oligomer content 1.95 wt. % resp. 0,83 wt. % and intrinsic viscosity 0.84 resp. 0.917.

Figure 2:
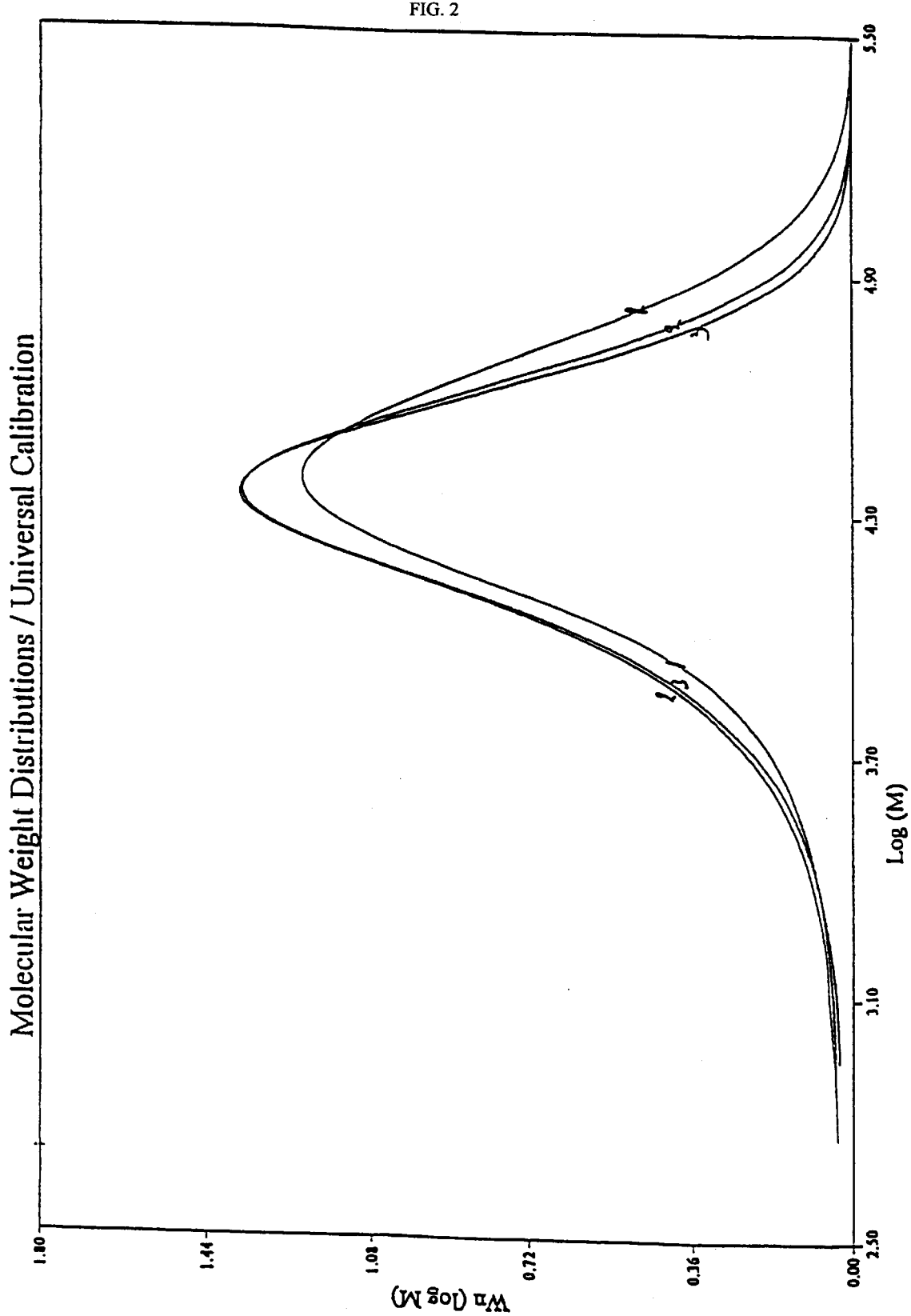
FIG. 2 illustrates molecular weight distributions as obtained by gel permeation chromatography (GPC) using the universal calibration method.
Figure 3:
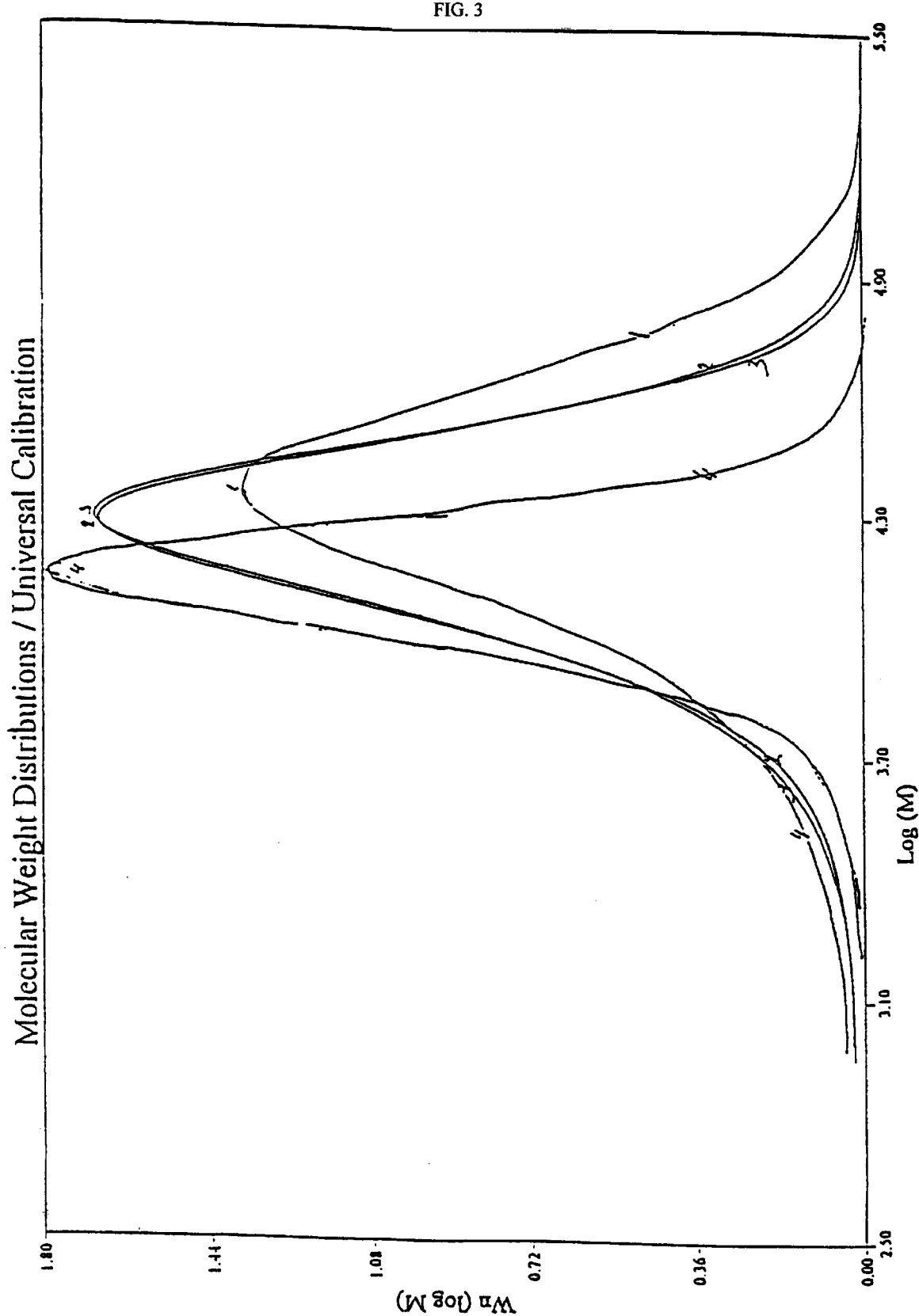
FIG. 3, illustrates molecular weight distributions as obtained by gel permeation chromatography (GPC) using the universal calibration method.

Molecular weight distributions as obtained by el permeation chromatography (GPC) using the universal alibration method[1] are presented in FIGS. 2 and 3.

In FIG. 2 curve 1 represents linear polyamide-6 F135C curve 2 represents polyamide A.1.

curve 3 represents a linar polyamide-6 having the same relative viscosity as A.1.

In FIG. 3 curve 1 represents the linear reference polyamide-6 curve 2 represents a branched polyamide-6, armlength 50 units with 4-aminomethyl-1,8-octanediamine as a core molecule (postcondensed)

curve 3 represents polyamide B.1.

curve 4 represents polyamide B.2.

C.1. Linear polyamide-6, Akulon® VMT 1203, having a melt viscosity $\eta_o=800$ Pa·s and balanced end group content.

EXPERIMENT 1

The dynamic viscosity of some of the above polyamides was measured with a Rheometrics 800 apparatus going from high to low frequency. The extrapolated value of the viscosity for the shearing force at a frequency 0, $\eta_o$, is presented in the tables. The viscosity was measured after various time intervals.

Conditions of the GPC determination:

- solvent and eluent hexafluor isopropanol
- chromatograph HP 1090 Nr. 2 of Hewlett Packard
- column filling Nucleosyl-70H of Machery Nagel. column temperature 35° C.
- detection by differential diffractometer and viscosimeter model H502B of Viscotak
- software Trisec 2.70 programme

TABLE 1

| | $\eta_o$ [Pa.s] | | | |
|---|---|---|---|---|
| | 10' | 30' | 60' | Opm. |
| Akulon F135C | 3000 | 3200 | | |
| A.1. | 225 | 200 | | discoloured |
| B.1. without | 350 | 385 | | |

TABLE 1-continued

| | $\eta_r$[Pa.s] | | | |
|---|---|---|---|---|
| | 10' | 30' | 60' | Opm. |
| postcondensation | | | | |
| B.1. post-condensed | 613 | | 640 | 660 |
| C.1. Akulon VMT 1203 | 800 | 870 | | |

In the postcondensed state, nylon B1 has an appreciably better stability of the melt viscosity.

EXPERIMENT 2 (Comparative Example A)

Polyamide A.1. was spun on a Fourné spinning tester apparatus at a temperature of 240° C. and a winding speed of 550 m/min. The yarn titre was 70/10 dtex.

This yarn was stretched at various stretch ratios and stretch temperatures.

The relative viscosity of the polyamide before spinning and of the polyamide in the fiber was measured in $H_2SO_4$ (1 g/100 ml 96%).

TABLE 2

| | $\eta_{rel}$ | Water-soluble extract % by wt. |
|---|---|---|
| A.1. before spinning | 2.52 | 1.5 |
| A.1. after spinning | 2.28 | 1.1 |

The polyamide A.1. is obviously not stable and still undergoes changes during the melt spinning, as a result of which the spinning process will be difficult to reproduce and sensitive to interruptions.

The mechanical properties of cold stretched yarn are compared with those of yarns obtained with a linear nylon-6 having $\eta_{rel}$=2.42 and for the hot-stretched yarns with a nylon-6 type having $\eta_{rel}$3.35.

TABLE 3

| | tenacity | elongation | modulus |
|---|---|---|---|
| cold-stretched | 0 | ++ | --- |
| hot-stretched | -- | 0 | - |

0 = equivalent
- = < 10% lower
-- = > 10% lower
--- = > 50% lower
+ = < 10% higher than reference
++ = > 10% higher
+++ = > 50% higher EXPERIMENT 3. Example I and Comparative Example B Fiber was spun and stretched from polyamide B.1. and C.1. under the conditions specified below on the same Fourne spinning tester apparatus and Erdmann-Fourné stretching apparatus.

Spinning Conditions:

Temperature of spinning extruder 240-260-260° C. and spinning head 260° C. Extruder pressure 70 bar. 20% by volume of Estecol NCW® was used as avivage and 3 g/l of Nekal BX® was used as moistening agent.

The production rate was 15.1 g/min. The winding speed 500 m/min.

Stretching Conditions:

The fibers were stretched at 160° C. with stretch ratios of 1.08 and 3.47 to a total of 3.75 at maximum friction. The stretching speed was 1000 m/min.

The spinning proceeded without problems, but it was noticeable that the filter pressure for B.1. was only 27 bar, in contrast to 32 bar for C.1.

The mechanical properties of the yarns obtained differ very little. Thus, the strength is at the same level, the elongation of the yarn of the linear polyamide is approximately 8% better, the modulus of elasticity of the yarn according to the invention is, on the other hand, approximately 25% higher. Since optimization of spinning conditions has not been carried out for the fiber of the invention, it can only be stated at present that the fiber according to the invention has at least comparable mechanical properties with respect to fibers based on linear polyamide having the same relative viscosity.

Figure 1A:
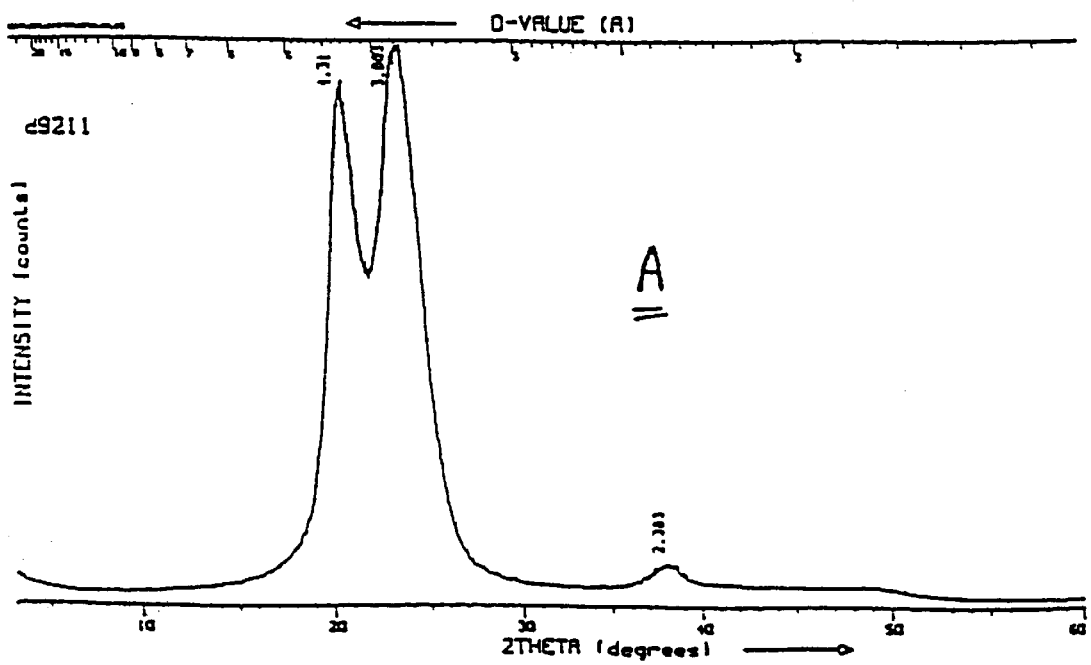
FIG. 1A is an X-ray diffraction (WAXS) curve for the fiber of polyamide B-1.

The morphology of the fibers was studied by X-ray diffraction (WAXS). Identical powder diagrams were obtained. See FIG. 1. In FIG. 1, A is the curve for the fiber of polyamide B.1. and B is that for the fiber of polyamide C.1.

Just as in experiment 2, the relative viscosity and the water-soluble extract content of the polyamide was determined before and after spinning. The amino and carboxyl end group contents were also determined by the standard potentiometric titration method for this purpose.

TABLE 4

| | rel. visc. $\eta_{rel}$ | $NH_2$ [meq/kg] | COOH [meq/kg] | water-soluble extract % |
|---|---|---|---|---|
| C.1. | 2.82 | 47 | 49 | <0.6 |
| C.1. fibre | 2.93 | 43 | 43 | 1.1 |
| B.1. | 2.69 | —*) | 98 | 0.8 |
| B.1. fibre | 2.69 | —*) | 97 | 0.4 |

*) No end groups can be determined by the standard method.

It also emerges very clearly from this experiment that the branched polyamide is not subject to any noticeable changes during the spinning process.

The water-soluble extract is surprisingly low, as a result of which less stringent environmental requirements are necessary during spinning and application for the foodstuffs industry, for example, meets fewer problems.

EXPERIMENT 4

Determination of the Hydrolysis Stability of Fibers

The fibers obtained from experiment 3 were immersed for a fairly long time in water and in water to which 0.25 ml of concentrated sulphuric acid per liter had been added.

At 95° C., the strength was measured after 15 minutes. Strength as % of the strength at the instant t =0.

TABLE 5

| | water | + $H_2SO_4$ |
|---|---|---|
| Fibre B.1. branched | 99 | 99 |
| Fibre C.1. linear | 98 | 84 |

EXPERIMENT 5
Determination of Affinity for Acidic Dyestuffs

This determination was carried out with Tectilon G-01 blue 200%® supplied by Ciba-Geigy according to the advice by the supplier in his brochure entitled "Acid dyes, product information of Tectilon".

The dyeing conditions are briefly stated in the table below.

TABLE 6

| Temperature profile | - 12 min 20° C. |
| --- | --- |
| | - 70 min linear temperature increase to 100° C. |
| | - 35 min 100° C. |
| Additives | - 0.5 g/l Albegal ® |
| | - 0.5% Univadine ® |
| | - 1.5% ammonium acetate acetic acid to pH = 5 to 5.5 |
| | - 85 mg/l dyestuff |
| liquid ratio | 600 |

After dyeing, the yarns were carefully cleaned with cold water. The dyestuff content of the fibers was determined by dissolving the fibers in concentrated formic acid and determining the light absorption of these solutions with a spectrophotometer; the absorption value was kept between 0.2 and 1.2 by adequate dilution.

The following values were found for the dyestuff absorption by the various fibers.

TABLE 7

| | dyestuff absorption mg/g of nylon | dyestuff abs./$NH_2$ ratio [mg/meq] | dyestuff abs./triazine ratio [mg/meq] |
| --- | --- | --- | --- |
| B.1. | 2.11 | — | 0.054 |
| C.1. | 2.60 | 0.061 | |
| GL1030*) | 2.61 | 0.060 | |

GL1030 is nylon-6 for a standard textile fibre.

It is very surprising that, despite the absence of amino end groups, the fiber of the branched nylon has a dyestuff absorption comparable with a standard textile fiber. Obviously, this core molecule of the branched polyamide can be protonated in the dyeing bath by the presence of the triazine ring.

There is no reason to assume that other branched polyamides which do not have amino end groups but do have a protonatable core would not have this affinity for dyestuffs.

EXPERIMENT 6
High-speed Spinning Properties

In a further experiment the high speed spinning properties of the branched polyamide B.1 have been compared with the linear polyamide C and polyamide GL 1030. It should be remarked that the viscosity of both polyamide B.1 and C is relatively high for high-speed spinning. For this reason the spinning temperatures were set at 275° C. For GL 1030 the spinning temperature was set at 260° C. Polyamide B.1 did not contain any additional stabilizer. Polyamide C contained 15 ppm Mn-acetate.

The spinning was performed on a MEX-BARMAG SW46SD apparatus. Spinning speed was 5000–5500 m/min. The same avivage and moisture agent as in the preceding experiments were used.

Chemical analysis prove that the polyamide B.1 is stable also under the more severe conditions of high-speed spinning. See Table 8.

TABLE 8

| | $NH_2$ [meq/kg] | water soluble extract wt. % |
| --- | --- | --- |
| B.1. | 43* | 0.8 |
| B.1. fibre | 44* | 1.2 |
| C.1. | 45 | 0.5 |
| C.1. fibre | 41 | 1.9 |
| GL 1030 | 39 | 0.5 |
| GL 1030 fibre | 35 | 1.9 |

*determined as total basisity.

Dyeability of B.1 and GL 1030 fiber expressed as mg/meq was approximately equal.

In heat stability (2 minutes at 185° C. in air oven) expressed as retention of tensile strength and retention of elongation, the fibers of the branched polyamide are equal to the stabilized C.1 and far superior over those of the unstabilized GL 1030.

Hydrolytic stability measured after 15' minutes in 400 ml water containing 1 ml sulfuric acid (96%) at 95° C.

| | strength | elongation [%] | E-mod. |
| --- | --- | --- | --- |
| B.1. | 81 | 80 | 64 |
| C.1. | 64 | 83 | 72 |
| GL 1030 | 62 | 84 | 40 |

What is claimed is:

1. A polyamide fiber obtained by melt-spinning from a polyamide composition that comprises at least a star-branched polyamide containing a core and branches, wherein the polyamide composition has a molecular weight distribution of Mz/Mw of less than 1.5.

2. A polyamide fiber according to claim 1, wherein the number of branches of the star-branched polyamide is 3–20.

3. A polyamide fiber according to claim 2, wherein the number of branches is 3–10.

4. A polyamide fiber according to claim 1, wherein the branches of the star-branched polyamide are joined to a core whose size is smaller than the average length of said branches.

5. A polyamide fiber according to claim 1, wherein the core compound is stable at the melting point of the polyamide.

6. A polyamide fiber according to claim 1, wherein the branches of said star-branched polyamide originate from a core, said core being obtained from a molecule containing at least 3 identical functional groups.

7. A polyamide fiber according to claim 6, wherein the functional groups are carboxylic acid groups.

8. A polyamide fiber according to claim 1, wherein the branches selected from the group consisting of polyamides obtained by the polycondensation of α,ω-aminocarboxylic acids and polyamides obtained by the ring-opening polymerization of lactams.

9. A polyamide fiber according to claim 1, wherein the polyamide composition also contains a linear polyamide.

10. A polyamide fiber according to claim 9, wherein said polyamide composition the linear polyamide content is lower than the start-branched polyamide content.

11. A polyamide fiber according to claim 1, wherein the branches have a number-average molecular weight of at least 4,000.

12. A polyamide fiber according claim 9, wherein the linear polyamide has an average chain length that is at most equal to the average chain length of the branches in the star-branched polyamide.

13. A polyamide fiber according to claim 1, wherein the molecular weight distribution Mz/Mw is less than 1.4.

14. A polyamide fiber according to claim 1 or 9, wherein the polyamide is poly-ε-caprolactam.

15. A polyamide fiber according to claim 1 or 9, wherein the core has at least 3 carboxyl groups.

16. A polyamide fiber according to claim 14, wherein the carboxylic groups are not sterically hindered.

17. A polyamide fiber according to claim 7, wherein the core molecule contains alkaline sites which are not reactive.

18. A polyamide fiber according to claim 16, wherein that the core molecule contains at least one heteroatom.

19. A polyamide fiber according to claim 17, wherein the core molecule contains at least one secondary-bound or tertiary-bound nitrogen atom.

20. A polyamide fiber according to claim 18, wherein the core molecule is selected from the group consisting of secondary or tertiary alkylamines and heterocyclic compounds containing at least one nitrogen atom in the ring.

21. A polyamide fiber according to claim 19, wherein the core is formed using a 1,3,5-triazine compound.

22. A polyamide fiber according to claim 20, wherein the core is formed using 2,4,6-triasaminocaproic acid 1,3,5-triazine.

23. A polyamide fiber according to claim 1 or 9, wherein said melt-spinning the spinning speed is at least about 5,000 m/min.

24. A polyamide fiber obtained by melt-spinning from a polyamide composition, comprising a core and branches, wherein the star-branched polyamide is obtained by copolymerizing a core molecule with the monomer for the chain units of the polyamide.

* * * * *